United States Patent
Xie et al.

(10) Patent No.: US 10,856,295 B2
(45) Date of Patent: Dec. 1, 2020

(54) COMMUNICATION METHOD AND COMMUNICATIONS DEVICE

(71) Applicant: Huawei Technologies Co., Ltd., Shenzhen (CN)

(72) Inventors: Xinqian Xie, Beijing (CN); Zhiheng Guo, Beijing (CN); Wei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,496

(22) Filed: Mar. 29, 2019

(65) Prior Publication Data
US 2019/0230660 A1    Jul. 25, 2019

Related U.S. Application Data

(63) Continuation of application No. PCT/CN2017/104025, filed on Sep. 28, 2017.

(30) Foreign Application Priority Data

Sep. 30, 2016    (CN) .......................... 2016 1 0876845

(51) Int. Cl.
*H04W 72/04*    (2009.01)
*H04W 56/00*    (2009.01)
(Continued)

(52) U.S. Cl.
CPC ....... *H04W 72/0446* (2013.01); *H04W 16/32* (2013.01); *H04W 56/005* (2013.01);
(Continued)

(58) Field of Classification Search
CPC ..... H04W 88/14; H04W 88/08; H04W 88/06; H04W 56/005; H04W 16/32; H04W 72/04; H04W 72/0446
See application file for complete search history.

(56) References Cited

U.S. PATENT DOCUMENTS

| 2010/0222068 A1 | 9/2010 | Gaal et al. |
| 2013/0201966 A1 | 8/2013 | Weng et al. |

(Continued)

FOREIGN PATENT DOCUMENTS

| CN | 101754351 A | 6/2010 |
| CN | 102342049 A | 2/2012 |
| CN | 104254102 A | 12/2014 |

*Primary Examiner* — Brian D Nguyen
(74) *Attorney, Agent, or Firm* — Leydig, Voit & Mayer, Ltd.

(57) ABSTRACT

A communication method includes: determining, by a first base station, a first time adjustment parameter, where the first time adjustment parameter is determined based on a time sequence of a first subframe, and the first subframe is a transmission subframe between the first base station and a second base station; and sending, by the first base station, the first time adjustment parameter to a terminal, where the first time adjustment parameter is used by the terminal to determine a timing of a second subframe, and the second subframe is a transmission subframe between the terminal and the first base station. A micro base station sends a time adjustment parameter to a terminal, and the terminal determines a timing of a micro access link subframe, to implement space division multiplexing of a backhaul link and a micro access link.

17 Claims, 6 Drawing Sheets

---

A first base station determines a first time adjustment parameter, where the first time adjustment parameter is determined based on a time sequence of a first subframe, and the first subframe is a transmission subframe between the first base station and a second base station    — S201

The first base station sends the first time adjustment parameter to a terminal, where the first time adjustment parameter is used by the terminal to perform timing on a second subframe, and the second subframe is a transmission subframe between the terminal and the first base station    — S202

(51) Int. Cl.
  *H04W 88/06*  (2009.01)
  *H04W 88/08*  (2009.01)
  *H04W 88/14*  (2009.01)
  *H04W 16/32*  (2009.01)
  *H04W 84/04*  (2009.01)

(52) U.S. Cl.
  CPC ........... *H04W 72/04* (2013.01); *H04W 84/04* (2013.01); *H04W 88/06* (2013.01); *H04W 88/08* (2013.01); *H04W 88/14* (2013.01)

(56) References Cited

U.S. PATENT DOCUMENTS

| | | |
|---|---|---|
| 2014/0092894 A1 | 4/2014 | Rossetti |
| 2015/0223124 A1* | 8/2015 | Wang .................... H04W 24/08 455/436 |
| 2017/0063484 A1* | 3/2017 | Naghshvar ........... H04J 11/0023 |
| 2017/0078077 A1* | 3/2017 | Hessler ............... H04L 27/2646 |
| 2017/0079028 A1* | 3/2017 | Dinan .................. H04W 56/001 |
| 2017/0118753 A9* | 4/2017 | Dinan .................... H04W 52/06 |

* cited by examiner

FIG. 1

| A first base station determines a first time adjustment parameter, where the first time adjustment parameter is determined based on a time sequence of a first subframe, and the first subframe is a transmission subframe between the first base station and a second base station | S201 |

↓

| The first base station sends the first time adjustment parameter to a terminal, where the first time adjustment parameter is used by the terminal to perform timing on a second subframe, and the second subframe is a transmission subframe between the terminal and the first base station | S202 |

FIG. 8b ns device.

COMMUNICATION METHOD AND COMMUNICATIONS DEVICE

CROSS-REFERENCE TO RELATED APPLICATIONS

This application is a continuation of International Application No. PCT/CN2017/104025, filed on Sep. 28, 2017, which claims priority to Chinese Patent Application No. 201610876845.6, filed on Sep. 30, 2016. The disclosures of the aforementioned applications are hereby incorporated by reference in their entireties.

TECHNICAL FIELD

The present invention relates to the field of communications technologies, and in particular, to a communication method and a communications device.

BACKGROUND

In an existing communications system, uplink/downlink transmission is performed between a base station and user equipment (UE), and there is also a communications link between base stations. A subframe transmitted on the communications link occupies a transmission resource between the base station and the user equipment (UE), leading to a decrease of a network capacity.

Figure 1:
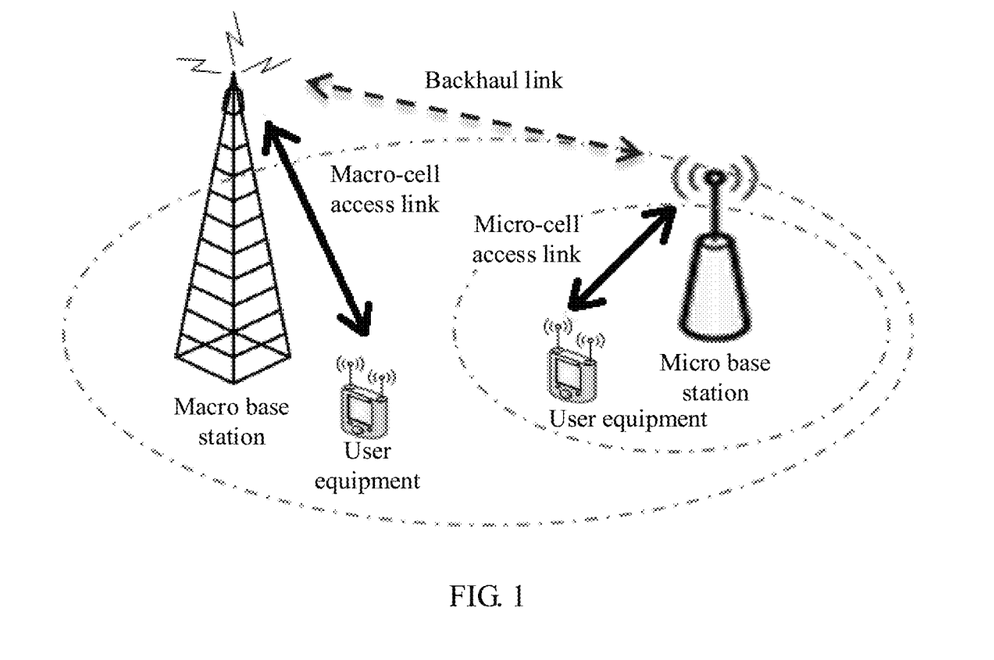
FIG. 1 is a diagram of a heterogeneous network scenario of a macro base station and a micro base station in the prior art.

A network system including a macro base station and a micro base station is used as an example. FIG. 1 is a diagram of a heterogeneous network scenario of a macro base station and a micro base station in the prior art. A coverage area of the micro base station is included in a coverage area of the macro base station. When user equipment (UE) is located in the coverage area of the micro base station, the user equipment accesses a micro cell, and the user equipment is referred to as micro-cell user equipment. When the user equipment is located outside the coverage area of the micro base station but in the coverage area of the macro base station, the user equipment accesses a macro cell, and the user equipment is referred to as macro-cell user equipment. A communications link between the macro base station and the macro-cell user equipment is referred to as a macro-cell access link, a communications link between the micro base station and the micro-cell user equipment is referred to as a micro-cell access link and a communications link between the macro base station and the micro base station is referred to as a backhaul link. Duplex modes of a Long Term Evolution (LTE)/Long Term Evolution Advanced (LTE-A) communications system are mainly classified into a frequency division duplex (FDD) mode and a time division duplex (TDD) mode based on differences of the duplex modes.

In the prior art, when the macro base station and the micro base station exchange information by using the backhaul link, the macro eNodeB (eNB) considers the micro eNB as a common user of the macro cell. To be specific, when uplink backhaul link transmission is performed, the micro eNB sends a signal to the macro eNB by using a transmission time sequence of an uplink macro access link. When receiving, by using the backhaul link, the signal sent by the micro eNB, the macro eNB may also receive a signal sent by the macro-cell user equipment in an uplink direction. When downlink backhaul link transmission is performed, the micro eNB receives a signal from the macro eNB by using a transmission time sequence of a downlink macro access link. When sending the signal to the micro eNB by using the backhaul link, the macro eNB may also send a downlink signal to the macro UE. In this way, space division multiplexing of the backhaul link and the macro access link can be implemented.

However, when the micro eNB and the macro eNB exchange information by using the backhaul link, the micro eNB uses a time sequence same as that of the macro UE, and this time sequence is different from a prior-art time sequence for communication between the micro eNB and the micro-cell user equipment, causing a sharp decrease of a network capacity.

Therefore, in a communications system including a plurality of base stations between which a communications link exists, how to effectively increase the network capacity and improve transmission efficiency is a technical problem to be resolved urgently.

SUMMARY

This application provides a communication method and a communications device, so that the method can implement space division multiplexing of a backhaul link and a micro access link.

A first aspect of this application provides a communication method. The method includes: determining, by a first base station, a first time adjustment parameter, where the first time adjustment parameter is determined based on a time sequence of a first subframe, and the first subframe is a transmission subframe between the first base station and a second base station; and sending, by the first base station, the first time adjustment parameter to a terminal, where the first time adjustment parameter is used by the terminal to determine a timing of a second subframe, and the second subframe is a transmission subframe between the terminal and the first base station.

In a first possible implementation of the first aspect, that the first time adjustment parameter is used by the terminal to determine a timing of a second subframe includes: when the first subframe is an uplink subframe sent by the first base station to the second base station, the first time adjustment parameter is used by the terminal to determine a downlink receive time of the second subframe, where a downlink transmit time of the second subframe is aligned with an uplink transmit time of the first subframe in a time-domain symbol; or when the first subframe is a downlink subframe sent by the second base station to the first base station, the first time adjustment parameter is used by the terminal to determine an uplink transmit time of the second subframe, where a downlink receive time of the first subframe is aligned with an uplink receive time of the second subframe in a time-domain symbol.

In a second possible implementation of the first aspect, the method further includes: determining, by the first base station, a frame structure of the first subframe and/or a frame structure of a third subframe adjacent to the first subframe in time, where the third subframe is a transmission subframe between the terminal and the first base station or a transmission subframe between the first base station and the second base station; and the frame structure includes at least one of a sequence number of a subframe start symbol, a sequence number of a subframe end symbol, and a quantity of symbols in a subframe.

With reference to the second possible implementation of the first aspect, in a third possible implementation of the first aspect, the determining, by the first base station, a frame structure of the first subframe and/or a frame structure of a third subframe adjacent to the first subframe in time specifically includes: when the first subframe is an uplink subframe, determining, by the first base station, the frame structure of the first subframe and/or the frame structure of the third subframe based on a type of the third subframe, where the third subframe is a subframe previous to the first subframe in time; or when the first subframe is a downlink subframe, determining, by the first base station, the frame structure of the first subframe and/or the frame structure of the third subframe based on a type of the third subframe, where the third subframe is a subframe after the first subframe in time.

With reference to the first aspect or the first, the second, or the third possible implementation of the first aspect, in a fourth possible implementation of the first aspect, the first time adjustment parameter is a UE-specific parameter or a cell-specific parameter.

In a fifth possible implementation of the first aspect, the first base station is a micro base station, and the second base station is a macro base station or a micro base station.

In a sixth possible implementation of the first aspect, the determining, by a first base station, a first time adjustment parameter, where the first time adjustment parameter is determined based on a time sequence of a first subframe includes: determining, by the first base station, the first time adjustment parameter based on the time sequence of the first subframe; or receiving, by the first base station, the first time adjustment parameter from the second base station, where the first time adjustment parameter is determined by the second base station based on the time sequence of the first subframe.

A second aspect of this application provides a communication method. The method includes: receiving a first time adjustment parameter sent by a first base station; and determining a timing of a second subframe by using the first time adjustment parameter, where the second subframe is a transmission subframe between a terminal and the first base station.

A third aspect of this application provides a communications device. The device is a first base station, and the first base station includes a first determining unit and a sending unit, where the first determining unit is configured to determine a first time adjustment parameter, where the first time adjustment parameter is determined based on a time sequence of a first subframe, and the first subframe is a transmission subframe between the first base station and a second base station; and the sending unit is configured to send the first time adjustment parameter to a terminal, where the first time adjustment parameter is used by the terminal to determine a timing of a second subframe, and the second subframe is a transmission subframe between the terminal and the first base station.

A fourth aspect of this application provides a terminal device. The terminal device includes: a receiving unit and a processing unit, where the receiving unit is configured to receive a first time adjustment parameter sent by a first base station; and the processing unit determines a timing of a second subframe by using the first time adjustment parameter, where the second subframe is a transmission subframe between the terminal device and the first base station.

A fifth aspect of this application provides an apparatus, including a processor and a memory. The memory stores a computer instruction, and the processor executes the computer instruction stored in the memory, so that the apparatus implements the foregoing communication method.

A sixth aspect of this application provides a computer storage medium. The computer storage medium stores a computer program, and when the program is executed by a processor, the foregoing communication method is implemented.

A seventh aspect of this application provides a computer program. When the computer program is executed on a computer, the computer performs the foregoing communication method.

In this application, a micro base station sends a time adjustment parameter to a terminal, and the terminal determines a timing of a micro access link subframe based on the time adjustment parameter, to implement space division multiplexing of a backhaul link and a macro access link, as well as space division multiplexing of a backhaul link and a micro access link. This effectively increases a network capacity and improves transmission efficiency.

DESCRIPTION OF EMBODIMENTS

To make objectives, technical solutions, and advantages of the present invention clearer, the following further describes the present invention in detail with reference to the accompanying drawings. The described embodiments are merely a part rather than all of the embodiments of the present invention. Other embodiments obtained by a person of ordinary skill in the art based on the described embodiments of the present invention without creative efforts may fall within the protection scope of the present invention.

In a Long Term Evolution (LTE)/Long Term Evolution Advanced (LTE-A) communications system, a heterogeneous networking manner may be used to increase a network capacity. As shown in FIG. 1, coverage areas of a macro cell and a micro cell are spatially isolated, and therefore the macro cell and the micro cell may use a same time-frequency resource for access link transmission. Considering that backhaul link transmission needs to occupy resources of both the macro cell and the micro cell and causes a decrease of the network capacity, to avoid a sharp decrease of the network capacity, space division multiplexing of a backhaul link and a macro or micro access link is performed, so that the backhaul link and the access link can share a same time-frequency resource.

In the embodiments of the present invention, a terminal may be a terminal device with a function of installing application software, such as a mobile phone, a tablet computer, a palmtop computer, or a personal digital assistant (PDA). This is not limited.

Figure 2:
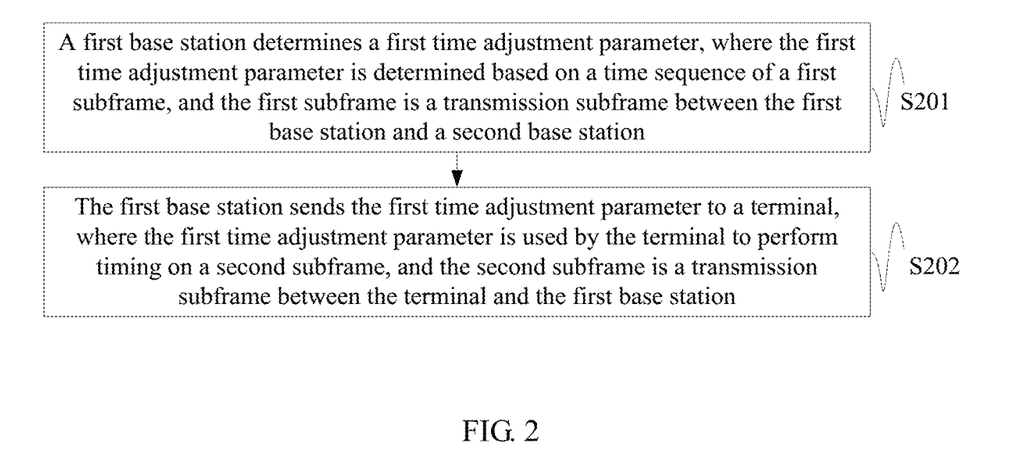
FIG. 2 is a schematic flowchart of a communication method according to an embodiment of the present invention.

The following uses FIG. 2 as an example to describe in detail a communication method on a micro base station side according to an embodiment of the present invention. FIG. 2 is a schematic flowchart of a communication method according to an embodiment of the present invention.

S201: A first base station determines a first time adjustment parameter, where the first time adjustment parameter is determined based on a time sequence of a first subframe, and the first subframe is a transmission subframe between the first base station and a second base station.

S202: The first base station sends the first time adjustment parameter to a terminal, where the first time adjustment parameter is used by the terminal to determine a timing of a second subframe, and the second subframe is a transmission subframe between the terminal and the first base station.

The first base station is a micro base station, and the second base station is a macro base station or a micro base station. The first subframe is a backhaul link subframe, and the second subframe is a micro access link subframe.

In the foregoing steps, that the first time adjustment parameter is used by the terminal to determine a timing of a second subframe is: when the first subframe is an uplink subframe sent by the first base station to the second base station, the first time adjustment parameter is used by the terminal to determine a downlink receive time of the second subframe, where a downlink transmit time of the second subframe is aligned with an uplink transmit time of the first subframe in a time-domain symbol; or when the first subframe is a downlink subframe sent by the second base station to the first base station, the first time adjustment parameter is used by the terminal to determine an uplink transmit time of the second subframe, where a downlink receive time of the first subframe is aligned with an uplink receive time of the second subframe in a time-domain symbol. In this way, space division multiplexing of the backhaul link subframe and the micro access link subframe is implemented.

The foregoing method for determining the first time adjustment parameter includes: determining, by the first base station, the first time adjustment parameter based on the time sequence of the first subframe; or receiving, by the first base station, the first time adjustment parameter from the second base station, where the first time adjustment parameter is determined by the second base station based on the time sequence of the first subframe. The first time adjustment parameter is a UE-specific parameter or a cell-specific parameter. The UE-specific parameter is a time sequence parameter unique to each user in a cell, and the cell-specific parameter is a time sequence parameter shared by all users in a cell.

It should be noted that the micro base station may send the first time adjustment parameter to the terminal in a static, semi-static, or dynamic manner. In the static manner, the micro base station sends a time-domain location of the backhaul link subframe to the terminal based on a preset time period, where the time period cannot be changed after being set. In the dynamic manner, the micro base station continuously sends a time-domain location of the backhaul link subframe to the terminal.

Specifically, the micro eNB sends a newly-defined UE-specific parameter NTA-BT to micro UE, and the micro UE may determine, based on the NTA-BT, a receive time sequence of the terminal in a downlink micro access link subframe multiplexed with an uplink backhaul link subframe; and the micro eNB informs the micro UE of a newly-defined UE-specific parameter NTA-BR, and the micro UE may determine, based on the NTA-BR, a transmit time sequence of the terminal in an uplink micro access link subframe multiplexed with a downlink backhaul link subframe.

In a possible implementation, at least one of the foregoing parameters NTA-BT and NTA-BR may be the cell-specific parameter. When the NTA-BR is the cell-specific parameter, the micro UE may further determine, based on the NTA-BR, a transmit time sequence in an uplink micro access link subframe multiplexed with a downlink backhaul link subframe. When the NTA-BT is the cell-specific parameter, the micro UE may further determine, based on the NTA-BT, a receive time sequence in a downlink micro access link subframe multiplexed with an uplink backhaul link subframe.

In another possible implementation, the micro eNB informs the micro UE of a newly-defined UE-specific parameter NTA-B, and the micro UE determines, based on the NTA-B, a receive time sequence in a downlink micro access link subframe multiplexed with an uplink backhaul link subframe, and may also determine, based on the NTA-B, a transmit time sequence in an uplink micro access link subframe multiplexed with a downlink backhaul link subframe. In another possible implementation, the time sequence parameter NTA-B may be the cell-specific parameter.

It should be noted that the micro base station sends the first time adjustment parameter in the semi-static manner. In the semi-static manner, the micro base station sends the first time adjustment parameter at an interval of a preset time period, where the preset time period can be adjusted.

A micro cell user adjusts the receive/transmit time sequence in the micro-cell access link subframe, and consequently, time-domain overlapping between the backhaul link subframe and t the micro access link subframe adjacent to the backhaul link subframe in time may occur. A prior-art solution is simply to puncture a symbol of the backhaul link subframe, causing a low transmission rate of a backhaul link. This is not applicable to a scenario in which a data volume of the backhaul link is large.

Therefore, the foregoing method further includes: determining, by the first base station, a frame structure of the first subframe and/or a frame structure of a third subframe adjacent to the first subframe in time, where the third subframe is a transmission subframe between the terminal and the first base station or a transmission subframe between the first base station and the second base station. The frame structure includes at least one of a sequence number of a subframe start symbol, a sequence number of a subframe end symbol, and a quantity of symbols in a subframe.

The determining, by the first base station, a frame structure of the first subframe and/or a frame structure of a third subframe adjacent to the first subframe in time specifically includes: when the first subframe is an uplink subframe, determining, by the first base station, the frame structure of the first subframe and/or the frame structure of the third subframe based on a type of the third subframe, where the third subframe is a subframe previous to the first subframe in time; or when the first subframe is a downlink subframe, determining, by the first base station, the frame structure of the first subframe and/or the frame structure of the third subframe based on a type of the third subframe, where the third subframe is a subframe after the first subframe in time.

It should be noted that both the base station and the terminal send and receive a signal based on a quantity of symbols included in a subframe and a start location of a first symbol. The subframe structure may be preconfigured. When performing backhaul link subframe transmission, the base station sends the signal according to a preset rule.

To be specific, the micro base station configures, based on a type of a subframe previous to an uplink backhaul link subframe, a structure of the uplink backhaul link subframe and/or a structure of the previous subframe, and configures, based on a type of a subframe after a downlink backhaul link subframe, a structure of the downlink backhaul link subframe and/or a structure of the next subframe. The type of the subframe includes an uplink access link subframe, a downlink access link subframe, an uplink backhaul link subframe, and a downlink backhaul link subframe. A short frame structure is configured for the backhaul link subframe and/or the micro access link subframe, to avoid overlapping between the backhaul link subframe and the micro access link subframe.

The following uses Table 1 and Table 2 as examples for detailed description. However, a short frame structure configured in the tables is merely used as an example, and a specific structure of the configured short frame is not limited in this embodiment of the present invention.

An LTE/LTE-A system is used as an example. As shown in Table 1, when a subframe previous to an uplink backhaul link subframe is an uplink micro access link subframe, a format of the uplink backhaul link subframe, configured by the micro base station, may be that a start symbol is symbol 0 and an end symbol is symbol 13, and a format of the previous uplink micro access link subframe, configured by the micro base station, may be that a start symbol is symbol 0 and an end symbol is symbol 12. When a subframe previous to the uplink backhaul link subframe is a downlink micro access link subframe, the format of the uplink backhaul link subframe, configured by the micro base station, may be that the start symbol is symbol 1 and the end symbol is symbol 13, and a format of the previous downlink micro access link subframe, configured by the micro base station, may be that a start symbol is symbol 0 and an end symbol is symbol 13. When a subframe previous to the uplink backhaul link subframe is an uplink backhaul link subframe, the format of the current backhaul link subframe, configured by the micro base station, may be that the start symbol is symbol 0 and the end symbol is symbol 13, and a format of the previous uplink backhaul link subframe, configured by the micro base station, may be that a start symbol is symbol 0 and an end symbol is symbol 13.

As shown in Table 2, when a subframe after a downlink backhaul link subframe is an uplink micro access link subframe, a format of the downlink backhaul link subframe, configured by the micro base station, may be that a start symbol is symbol 0 and an end symbol is symbol 13, and a format of the next uplink micro access link subframe, configured by the micro base station, may be that a start symbol is symbol 1 and an end symbol is symbol 13. When a subframe after the downlink backhaul link subframe is a downlink micro access link subframe, the format of the downlink backhaul link subframe, configured by the micro base station, may be that the start symbol is symbol 0 and the end symbol is symbol 13, and a format of the next downlink micro access link subframe, configured by the micro base station, may be that a start symbol is symbol 1 and an end symbol is symbol 13. When a subframe after the downlink backhaul link subframe is a downlink backhaul link subframe, the format of the current downlink backhaul link subframe, configured by the micro base station, may be that the start symbol is symbol 0 and the end symbol is symbol

TABLE 1

| Type of a subframe adjacent to a backhaul link subframe in time | Structure of an uplink backhaul link subframe | | Structure of a subframe adjacent to a backhaul link subframe in time | |
|---|---|---|---|---|
| | Sequence number of a start symbol | Sequence number of an end symbol | Sequence number of a start symbol | Sequence number of an end symbol |
| Uplink micro access link subframe | 0 | 13 | 0 | 12 |
| Downlink micro access link subframe | 1 | 13 | 0 | 13 |
| Uplink backhaul link subframe | 0 | 13 | 0 | 13 |

TABLE 2

| Type of a subframe adjacent to a backhaul link subframe in time | Structure of a downlink backhaul link subframe | | Structure of a subframe adjacent to a backhaul link subframe in time | |
|---|---|---|---|---|
| | Sequence number of a start symbol | Sequence number of an end symbol | Sequence number of a start symbol | Sequence number of an end symbol |
| Uplink micro access link subframe | 0 | 13 | 1 | 13 |
| Downlink micro access link subframe | 0 | 13 | 1 | 13 |
| Downlink backhaul link subframe | 0 | 13 | 0 | 13 |

13, and a format of the next backhaul link subframe, configured by the micro base station, may be that a start symbol is symbol 0 and an end symbol is symbol 13.

Generally, the micro base station configures, according to a predetermined rule, a structure of the backhaul link subframe and/or a structure of the micro access link subframe adjacent to the backhaul link subframe in time.

The predetermined rule may be an operation on the backhaul link subframe, for example, puncturing a symbol of the backhaul link subframe; or the rule may be an operation on the micro access link subframe adjacent to the backhaul link subframe in time, for example, puncturing a symbol of the micro access link subframe; or the rule may be an operation on both the backhaul link subframe and the micro access link subframe adjacent to the backhaul link subframe in time, for example, puncturing both a symbol of the backhaul link subframe and a symbol of the micro access link subframe. This is to avoid time-domain overlapping between the backhaul link subframe and the micro access link subframe.

In other words, the predetermined rule may be an operation to be performed on the backhaul link subframe and/or the subframe adjacent to the backhaul link subframe in time based on a type of the subframe adjacent to the backhaul link subframe in time.

Specifically, the rule may be: when a subframe previous to an uplink backhaul link subframe is a micro access link subframe, puncturing a symbol of the backhaul link subframe; and when a subframe after a downlink backhaul link subframe is a micro access link subframe, puncturing a symbol of the backhaul link subframe.

Alternatively, the rule may be: when the subframe previous to the uplink backhaul link subframe is a micro access link subframe, puncturing a symbol of the micro access link subframe; and when the subframe after the downlink backhaul link subframe is a micro access link subframe, puncturing a symbol of the micro access link subframe.

Alternatively, the rule may be: when the subframe previous to the uplink backhaul link subframe is a micro access link subframe, puncturing a symbol of the micro access link subframe; and when the subframe after the downlink backhaul link subframe is a micro access link subframe, puncturing a symbol of the backhaul link subframe.

It should be noted that the first base station may alternatively be a macro base station, and in this case, the terminal is a terminal served by the first base station, and the second base station is another macro base station.

Figure 3:
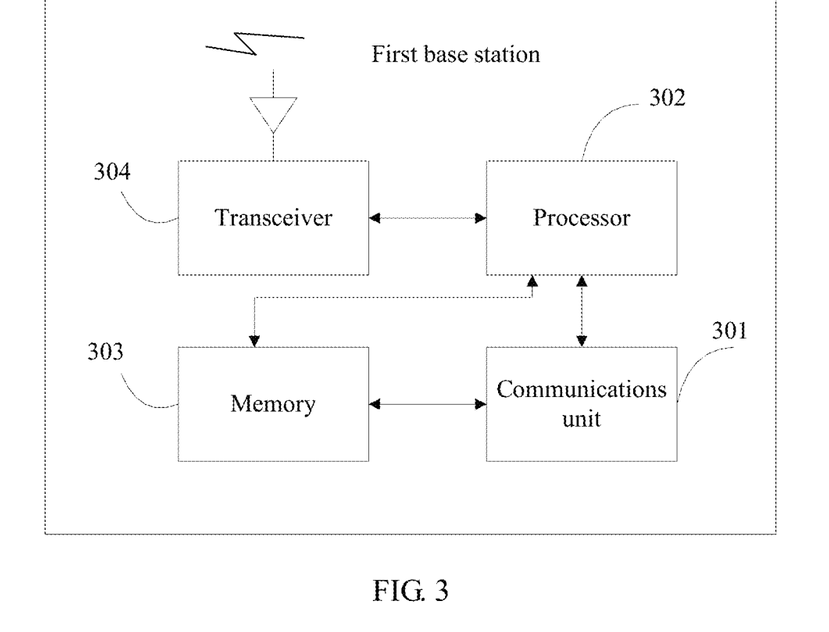
FIG. 3 is a schematic structural diagram of hardware of a micro base station according to an embodiment of the present invention.

The following uses FIG. 3 as an example to describe an entity structure of a first base station according to an embodiment of the present invention. FIG. 3 is a schematic structural diagram of hardware of a first base station according to an embodiment of the present invention.

The first base station includes a communications unit 301, a processor 302, and a memory 303. Modules may be connected by using a bus. The communications unit 301 is configured to communicate with a macro base station and another micro base station. The memory 303 is configured to store program code and data of the first base station. In addition, the first base station may further include a transceiver 304, and the transceiver 304 is configured to support communication between the first base station and a terminal.

The processor 302 is configured to:

determine a first time adjustment parameter, where the first time adjustment parameter is determined based on a time sequence of a first subframe, and the first subframe is a transmission subframe between the first base station and a second base station; and send the first time adjustment parameter to a terminal, where the first time adjustment parameter is used by the terminal to determine a timing of a second subframe, and the second subframe is a transmission subframe between the terminal and the first base station.

The first base station may be a micro base station.

Figure 4:
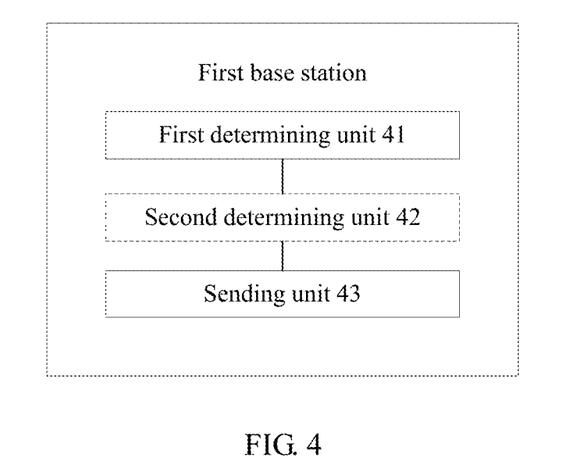
FIG. 4 is a schematic structural diagram of a communications apparatus according to an embodiment of the present invention.

The following uses FIG. 4 as an example to describe a communications apparatus according to an embodiment of the present invention, and the communications apparatus is a first base station. As shown in FIG. 4, the first base station includes a first determining unit 41 and a sending unit 43.

The first determining unit 41 determines a first time adjustment parameter, where the first time adjustment parameter is determined based on a time sequence of a first subframe, and the first subframe is a transmission subframe between the first base station and a second base station.

The sending unit 43 sends the first time adjustment parameter to a terminal, where the first time adjustment parameter is used by the terminal to determine a timing of a second subframe, and the second subframe is a transmission subframe between the terminal and the first base station.

The first base station further includes a second determining unit 42, and the second determining unit 42 determines a frame structure of the first subframe and/or a frame structure of a third subframe adjacent to the first subframe in time, where the third subframe is a transmission subframe between the terminal and the first base station or a transmission subframe between the first base station and the second base station; and the frame structure includes at least one of a sequence number of a subframe start symbol, a sequence number of a subframe end symbol, and a quantity of symbols in a subframe.

In an example, when the first subframe is an uplink subframe, the second determining unit determines the frame structure of the first subframe and/or the frame structure of the third subframe based on a type of the third subframe, where the third subframe is a subframe previous to the first subframe in time; or when the first subframe is a downlink subframe, the second determining unit determines the frame structure of the first subframe and/or the frame structure of the third subframe based on a type of the third subframe, where the third subframe is a subframe after the first subframe in time.

The first time adjustment parameter is a UE-specific parameter or a cell-specific parameter. The first base station is a micro base station, and the second base station is a macro base station or a micro base station.

It should be noted that the first determining unit 41 determines the first time adjustment parameter based on the time sequence of the first subframe, or the first determining unit 41 receives the first time adjustment parameter from the second base station, where the first time adjustment parameter is determined by the second base station based on the time sequence of the first subframe.

Figure 5:
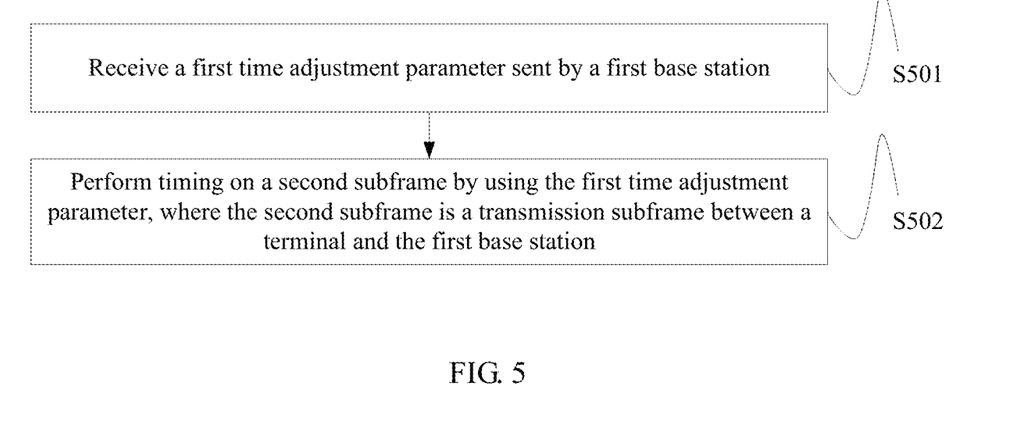
FIG. 5 is a schematic flowchart of another communication method according to an embodiment of the present invention.

The following uses FIG. 5 as an example to describe a method on a terminal side. FIG. 5 is a schematic flowchart of another communication method according to an embodiment of the present invention. As shown in FIG. 5, the method includes steps S501 and S502.

S501: Receive a first time adjustment parameter sent by a first base station.

S502: Determining a timing of a second subframe by using the first time adjustment parameter, where the second subframe is a transmission subframe between a terminal and the first base station.

The first time adjustment parameter is determined based on a time sequence of a first subframe, and the first subframe is a transmission subframe between the first base station and a second base station.

In the step, determining a timing of a second subframe by using the first time adjustment parameter includes: when the first subframe is an uplink subframe sent by the first base station to the second base station, determining, by the terminal, a downlink receive time of the second subframe by using the first time adjustment parameter, where a downlink transmit time of the second subframe is aligned with an uplink transmit time of the first subframe in a time-domain symbol; or when the first subframe is a downlink subframe sent by the second base station to the first base station, determining, by the terminal, an uplink transmit time of the second subframe by using the first time adjustment parameter, where a downlink receive time of the first subframe is aligned with an uplink receive time of the second subframe in a time-domain symbol.

It should be noted that the first subframe is a transmission subframe between the first base station and the second base station. The first subframe is a backhaul link subframe, and the second subframe is a micro access link subframe.

In the foregoing method, the first time adjustment parameter is a UE-specific parameter or a cell-specific parameter. The first base station is a micro base station, and the second base station is a macro base station or a micro base station.

Figure 6:
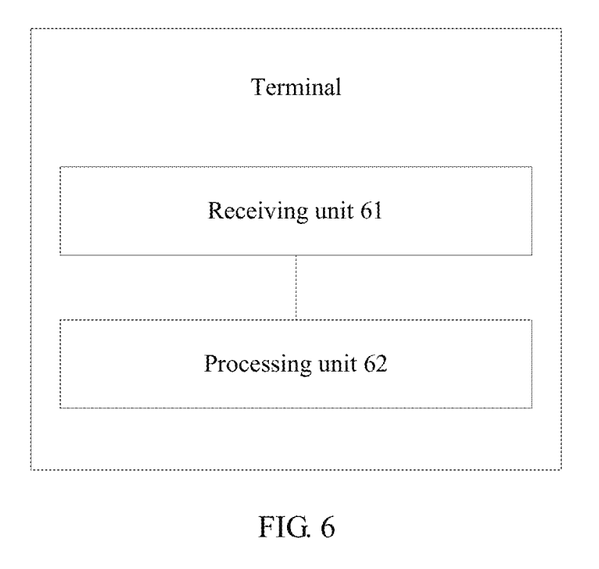
FIG. 6 is a schematic structural diagram of another communications apparatus according to an embodiment of the present invention.

The following uses FIG. 6 as an example to describe a terminal device according to an embodiment of the present invention. FIG. 6 is a schematic structural diagram of another communications apparatus according to an embodiment of the present invention. As shown in FIG. 6, the terminal device includes a receiving unit 61 and a processing unit 62.

The receiving unit 61 is configured to receive a first time adjustment parameter sent by a first base station.

The processing unit 62 is configured to determine a timing of a second subframe by using the first time adjustment parameter, where the second subframe is a transmission subframe between the terminal device and the first base station; where the first time adjustment parameter is determined based on a time sequence of a first subframe, and the first subframe is a transmission subframe between the first base station and a second base station.

In the foregoing apparatus, that the processing unit determines a timing of a second subframe by using the first time adjustment parameter is specifically: when the first subframe is an uplink subframe sent by the first base station to the second base station, determining, by the processing unit, a downlink receive time of the second subframe by using the first time adjustment parameter, where a downlink transmit time of the second subframe is aligned with an uplink transmit time of the first subframe in a time-domain symbol; or when the first subframe is a downlink subframe sent by the second base station to the first base station, determining, by the processing unit, an uplink transmit time of the second subframe by using the first time adjustment parameter, where a downlink receive time of the first subframe is aligned with an uplink receive time of the second subframe in a time-domain symbol.

It should be noted that the first subframe is a transmission subframe between the first base station and the second base station. The first subframe is a backhaul link subframe, and the second subframe is a micro access link subframe.

In the foregoing apparatus, the first time adjustment parameter is a UE-specific parameter or a cell-specific parameter. The first base station is a micro base station, and the second base station is a macro base station or a micro base station.

Figure 7:
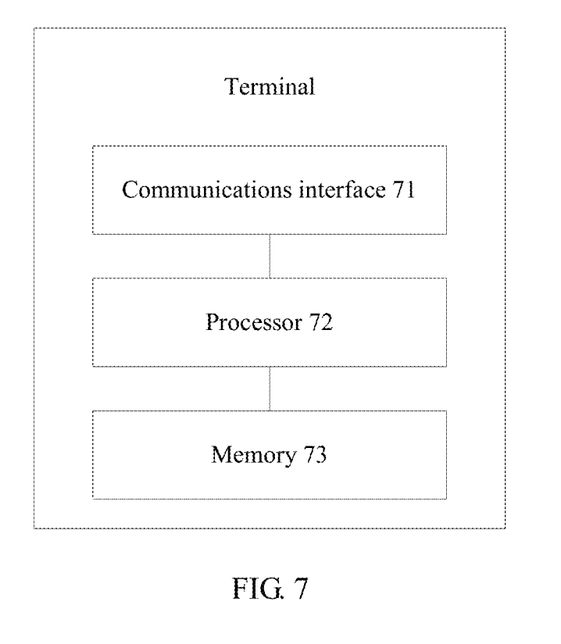
FIG. 7 is a schematic structural diagram of hardware of a terminal according to an embodiment of the present invention.

The following uses FIG. 7 as an example to describe a physical terminal apparatus according to an embodiment of the present invention. FIG. 7 is a schematic structural diagram of hardware of a terminal according to an embodiment of the present invention. As shown in FIG. 7, the terminal device includes a communications interface 71, a processor 72, and a memory 73.

The communications interface 71 is configured to communicate with an external device, the memory 73 is configured to store a computer instruction, and the processor 72 is configured to execute the computer instruction. The processor 72 is configured to execute the following instructions:

receiving a first time adjustment parameter sent by a first base station; and determining a timing of a second subframe by using the first time adjustment parameter, where the second subframe is a transmission subframe between the terminal and the first base station.

Figure 8A:
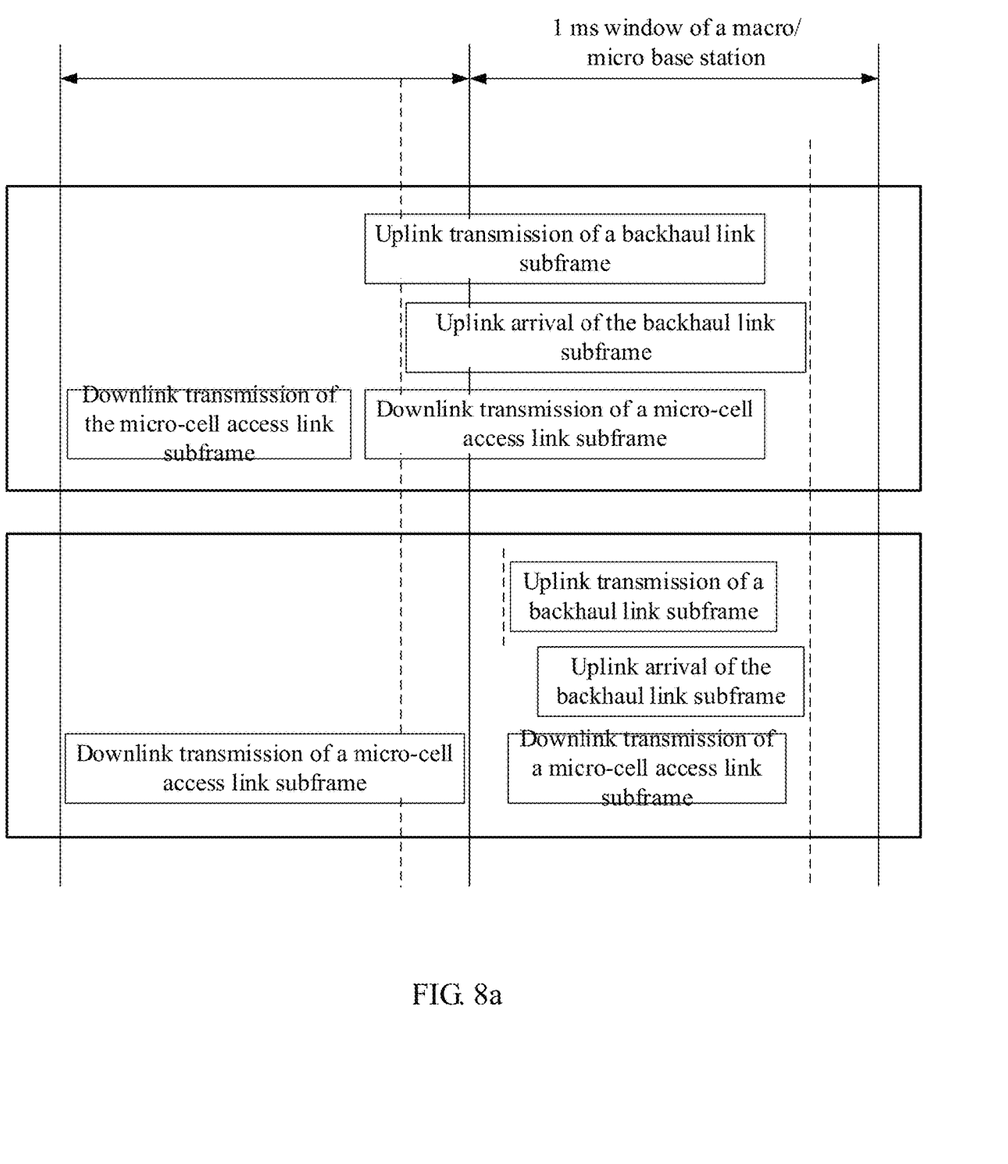
FIG. 8a is a schematic diagram of uplink backhaul link subframe transmission after a method according to an embodiment of the present invention is used.

FIG. 8a is a schematic diagram of uplink backhaul link subframe transmission after a method according to an embodiment of the present invention is used. As shown in FIG. 8a, a micro base station adjusts a time location for sending an uplink backhaul link subframe by the micro base station, so that a time location at which the uplink backhaul link subframe reaches a macro base station is exactly within an uplink receive time window of the macro base station. In addition, to avoid overlapping between the uplink backhaul link subframe and a downlink micro access link subframe previous to the uplink backhaul link subframe, a short frame structure may be used for the previous downlink micro access link subframe, that is, puncturing several end symbols of the subframe; or a short frame structure may be used for the uplink backhaul link subframe, that is, puncturing several start symbols of the subframe.

Figure 8B:
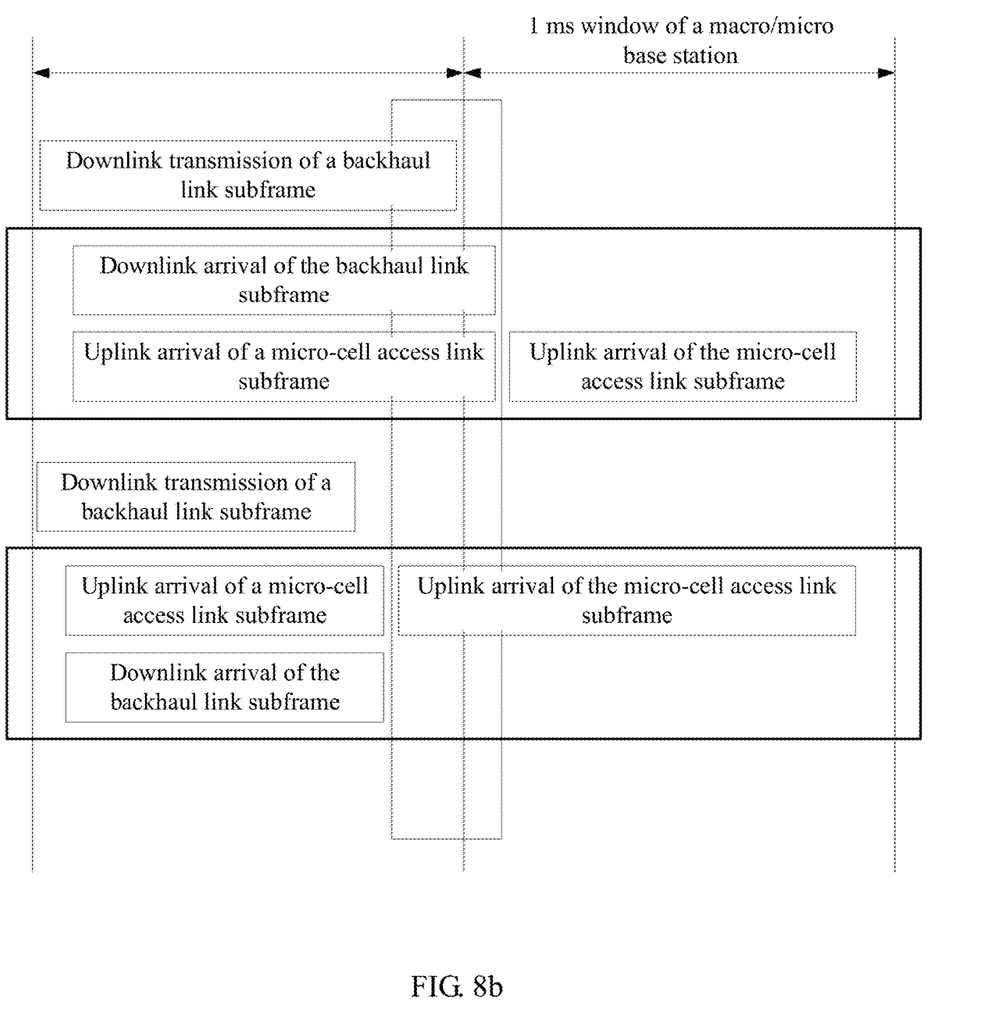
FIG. 8b is a schematic diagram of downlink backhaul link subframe transmission after a method according to an embodiment of the present invention is used.

FIG. 8b is a schematic diagram of downlink backhaul link subframe transmission after a method according to an embodiment of the present invention is used. As shown in FIG. 8b, a macro base station adjusts a time location for sending a downlink backhaul link subframe by the macro base station, so that a time location at which the downlink backhaul link subframe reaches a micro base station is exactly within a downlink receive time window of the micro base station. In addition, to avoid overlapping between the downlink backhaul link subframe and an uplink micro access link subframe after the downlink backhaul link subframe, a short frame structure may be used for the next uplink micro access link subframe, that is, puncturing several start symbols of the subframe; or a short frame structure may be used for the downlink backhaul link subframe, that is, puncturing several end symbols of the subframe.

This application can implement space division multiplexing of a backhaul link and a macro access link, as well as a backhaul link and a micro access link, to increase flexibility of the backhaul link while avoiding interference between a backhaul link subframe and an adjacent subframe.

A person skilled in the art may be further aware that, in combination with the examples described in embodiments disclosed in this specification, units and algorithm steps may be implemented by electronic hardware, computer software, or a combination thereof. To clearly describe the interchangeability between hardware and software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

Steps of methods or algorithms described in embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc read-only memory (CD-ROM), or any other form known in the art.

In the foregoing exemplary implementations, objectives, technical solutions, and benefits of the present invention are further described in detail. It should be understood that the foregoing descriptions are merely exemplary implementations of the present invention, but are not intended to limit the protection scope of the present invention. Any modification, equivalent replacement, or improvement made without departing from the spirit and principle of the present invention may fall within the protection scope of the present invention.

Additionally, statements made herein characterizing the invention refer to an embodiment of the invention and not necessarily all embodiments.

What is claimed is:

1. A communication method, wherein the method comprises:
   determining, by a micro base station, a first time adjustment parameter, wherein the first time adjustment parameter is determined based on a time sequence of a first subframe, and the first subframe is a transmission subframe between the micro base station and a macro base station, wherein a coverage area of the micro base station is smaller than and within a coverage area of the macro base station, and wherein the micro base station and the macro base station are connected via a backhaul link; and
   sending, by the micro base station, the first time adjustment parameter to a micro-cell terminal located within the coverage area of the micro base station to facilitate the micro-cell terminal using the first time adjustment parameter to determine a timing of a second subframe, wherein the second subframe is a transmission subframe between the micro-cell terminal and the micro base station, and wherein the micro base station and the micro-cell terminal are connected via a micro access link;
   wherein, based on the first time adjustment parameter being sent to the micro-cell terminal, space division multiplexing is implemented by the micro base station with respect to the backhaul link and the micro access link such that:
   a downlink transmit time of the second subframe on the backhaul link is temporally aligned with an uplink transmit time of the first subframe on the micro access link; or
   a downlink receive time of the first subframe on the backhaul link is temporally aligned with an uplink receive time of the second subframe on the micro access link.

2. The method according to claim 1, wherein the method further comprises:
   determining, by the micro base station, a frame structure of the first subframe and/or a frame structure of a third subframe adjacent to the first subframe in time, wherein the third subframe is a transmission subframe between the micro-cell terminal and the micro base station or a transmission subframe between the micro base station and the macro base station;
   wherein the frame structure of the first subframe and/or the frame structure of the third subframe comprises a sequence number of a subframe start symbol, a sequence number of a subframe end symbol, and/or a quantity of symbols in a subframe.

3. The method according to claim 2, wherein determining the frame structure of the first subframe and/or the frame structure of the third subframe comprises:
   determining, by the micro base station, the frame structure of the first subframe and/or the frame structure of the third subframe based on a type of the third subframe, wherein:
   the first subframe is an uplink subframe and the third subframe is a subframe previous to the first subframe in time; or
   the first subframe is a downlink subframe and the third subframe is a subframe after the first subframe in time.

4. The method according to claim 1, wherein the first time adjustment parameter is a user equipment (UE)-specific parameter or a cell-specific parameter.

5. The method according to claim 1, wherein the macro base station is configured to implement space division multiplexing with respect to the backhaul link and a macro access link, wherein the macro access link is between the macro base station and a macro-cell terminal located within the coverage area of the macro base station.

6. The method according to claim 1, wherein determining the first time adjustment parameter comprises:
   receiving, by the micro base station, the first time adjustment parameter from the macro base station, wherein the first time adjustment parameter is determined by the macro base station based on the time sequence of the first subframe.

7. A micro base station, wherein the micro base station comprises:
   a processor; and
   a transmitter;
   wherein the processor is configured to determine a first time adjustment parameter, wherein the first time adjustment parameter is determined based on a time sequence of a first subframe, and the first subframe is a transmission subframe between the micro base station and a macro base station, wherein a coverage area of the micro base station is smaller than and within a coverage area of the macro base station, and wherein the micro base station and the macro base station are connected via a backhaul link; and
   wherein the transmitter is configured to send the first time adjustment parameter to a micro-cell terminal located within the coverage area of the micro base station to facilitate the micro-cell terminal using the first time adjustment parameter to determine a timing of a second subframe, wherein the second subframe is a transmission subframe between the micro-cell terminal and the micro base station, and wherein the micro base station and the micro-cell terminal are connected via a micro access link;

wherein, based on the first time adjustment parameter being sent to the micro-cell terminal, the micro base station is configured to implement space division multiplexing with respect to the backhaul link and the micro access link such that:
  a downlink transmit time of the second subframe on the backhaul link is temporally aligned with an uplink transmit time of the first subframe on the micro access link; or
  a downlink receive time of the first subframe on the backhaul link is temporally aligned with an uplink receive time of the second subframe on the micro access link.

8. The micro base station according to claim 7, wherein the processor is further configured to determine a frame structure of the first subframe and/or a frame structure of a third subframe adjacent to the first subframe in time, wherein the third subframe is a transmission subframe between the micro-cell terminal and the micro base station or a transmission subframe between the micro base station and the macro base station; and
  wherein the frame structure of the first subframe and/or the frame structure of the third subframe comprises a sequence number of a subframe start symbol, a sequence number of a subframe end symbol, and/or a quantity of symbols in a subframe.

9. The micro base station according to claim 8, wherein determining the frame structure of the first subframe and/or the frame structure of the third subframe comprises:
  determining, by the micro base station, the frame structure of the first subframe and/or the frame structure of the third subframe based on a type of the third subframe, wherein:
    the first subframe is an uplink subframe and the third subframe is a subframe previous to the first subframe in time when the first; or
    the first subframe is a downlink subframe and the third subframe is a subframe after the first subframe in time.

10. The micro base station according to claim 7, wherein the first time adjustment parameter is a user equipment (UE)-specific parameter or a cell-specific parameter.

11. The micro base station according to claim 7, wherein the macro base station is configured to implement space division multiplexing with respect to the backhaul link and a macro access link, wherein the macro access link is between the macro base station and a macro-cell terminal located within the coverage area of the macro base station.

12. The micro base station according to claim 7, wherein determining the first time adjustment parameter comprises:
  receiving the first time adjustment parameter from the macro base station, wherein the first time adjustment parameter is determined by the macro base station based on the time sequence of the first subframe.

13. A system, comprising:
  a micro base station;
  a macro base station;
  a micro-cell terminal disposed within a coverage area of the micro base station; and
  a macro-cell terminal disposed within a coverage area of the macro base station;
  wherein the coverage area of the micro base station is smaller than and within the coverage area of the macro base station;
  wherein the micro base station and the macro base station are connected via a backhaul link, wherein the micro-cell terminal and the micro base station are connected via a micro access link, and wherein the macro-cell terminal and the macro base station are connected via a macro access link;
  wherein the micro base station is configured to:
    determine a first time adjustment parameter based on a time sequence of a first subframe, wherein the first subframe is a transmission subframe between the micro base station and the macro base station; and
    send the first time adjustment parameter to the micro-cell terminal;
  wherein the micro-cell terminal is configured to use the first time adjustment parameter to determine a timing of a second subframe, wherein the second subframe is a transmission subframe between the micro-cell terminal and the micro base station;
  wherein the micro base station is configured to implement, based on the first time adjustment parameter being sent to the micro-cell terminal, space division multiplexing with respect to the backhaul link and the micro access link such that:
    a downlink transmit time of the second subframe on the backhaul link is temporally aligned with an uplink transmit time of the first subframe on the micro access link; or
    a downlink receive time of the first subframe on the backhaul link is temporally aligned with an uplink receive time of the second subframe on the micro access link;
  wherein the macro base station is configured to implement space division multiplexing with respect to the backhaul link and the macro access link.

14. The system according to claim 13, wherein the micro base station is further configured to determine a frame structure of the first subframe and/or a frame structure of a third subframe adjacent to the first subframe in time, wherein the third subframe is a transmission subframe between the micro-cell terminal and the micro base station or a transmission subframe between the micro base station and the macro base station;
  wherein the frame structure of the first subframe and/or the frame structure of the third subframe comprises a sequence number of a subframe start symbol, a sequence number of a subframe end symbol, and/or a quantity of symbols in a subframe.

15. The system according to claim 14, wherein determining the frame structure of the first subframe and/or the frame structure of the third subframe comprises:
  determining the frame structure of the first subframe and/or the frame structure of the third subframe based on a type of the third subframe, wherein:
    the first subframe is an uplink subframe and the third subframe is a subframe previous to the first subframe in time; or
    the first subframe is a downlink subframe and the third subframe is a subframe after the first subframe in time.

16. The system according to claim 13, wherein the first time adjustment parameter is a user equipment (UE)-specific parameter or a cell-specific parameter.

17. The system according to claim 13, wherein determining the first time adjustment parameter comprises: receiving the first time adjustment parameter from the macro base station;
  wherein the macro base station is further configured to determine the first time adjustment parameter based on the time sequence of the first subframe.

* * * * *

UNITED STATES PATENT AND TRADEMARK OFFICE
CERTIFICATE OF CORRECTION

PATENT NO.         : 10,856,295 B2                                  Page 1 of 1
APPLICATION NO.    : 16/370496
DATED              : December 1, 2020
INVENTOR(S)        : Xie et al.

It is certified that error appears in the above-identified patent and that said Letters Patent is hereby corrected as shown below:

In the Claims

Claim 9: Column 15, Line 36: "in time when the first; or" should read -- in time; or --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*